March 29, 1932.  A. GORDON  1,851,172
GREASE TRAP
Filed Aug. 25, 1930   3 Sheets-Sheet 1
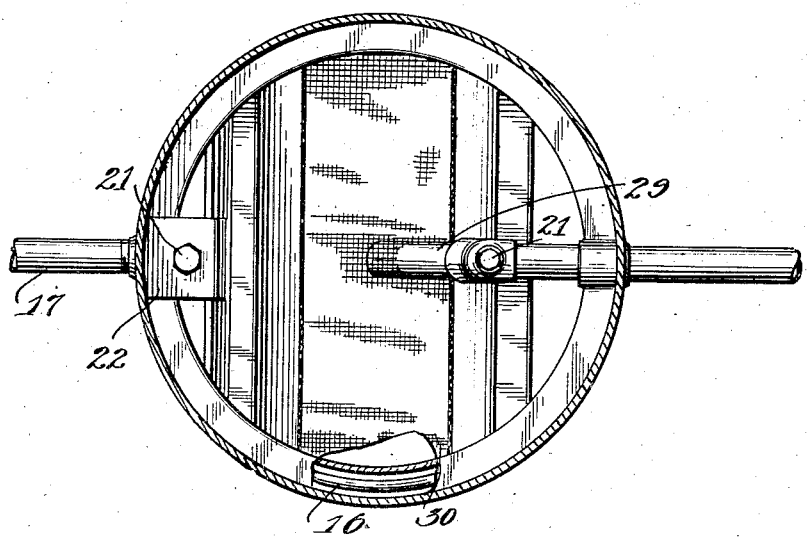
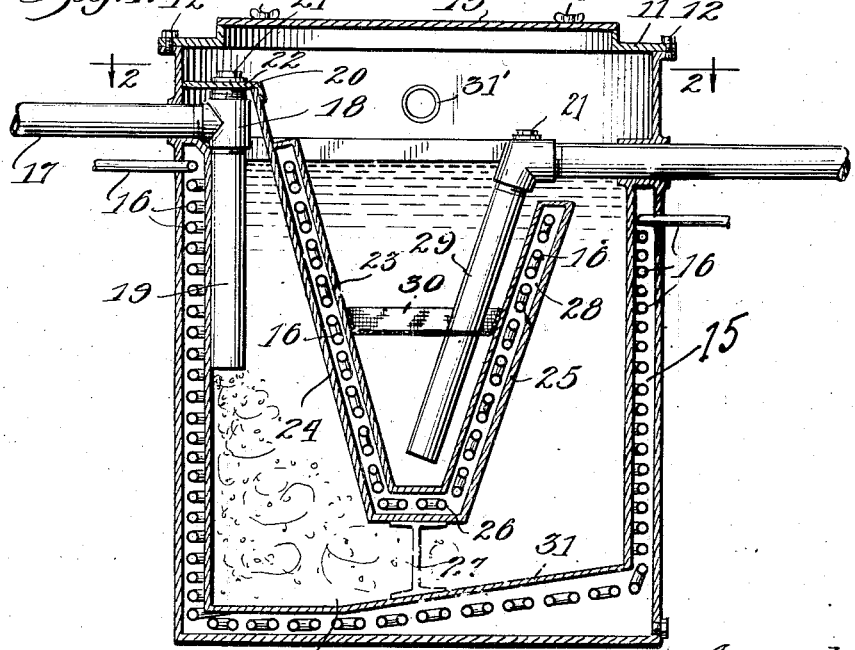
Inventor:
Arthur Gordon
By. [signature]
Atty.

March 29, 1932. A. GORDON 1,851,172
GREASE TRAP
Filed Aug. 25, 1930 3 Sheets-Sheet 2
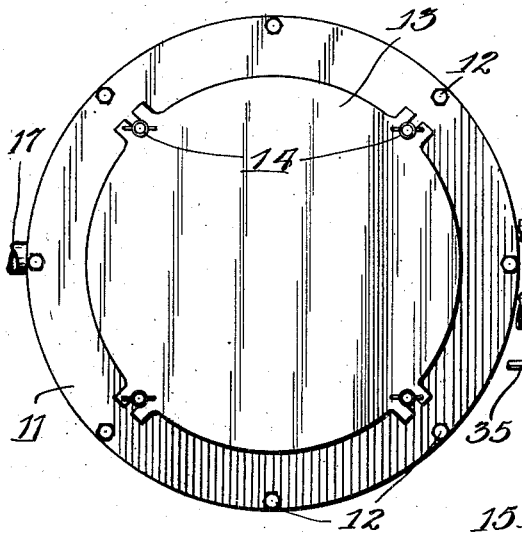
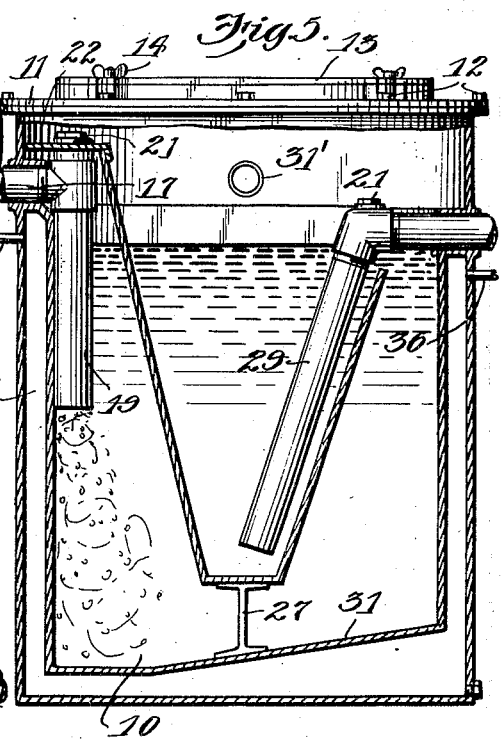
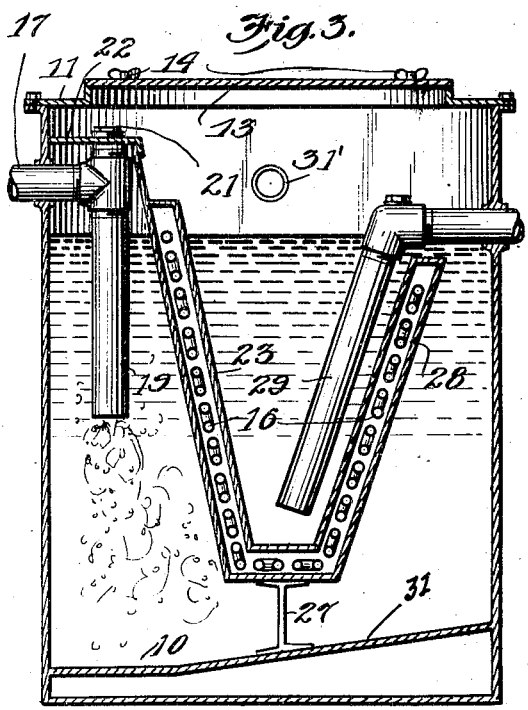
Inventor:
Arthur Gordon

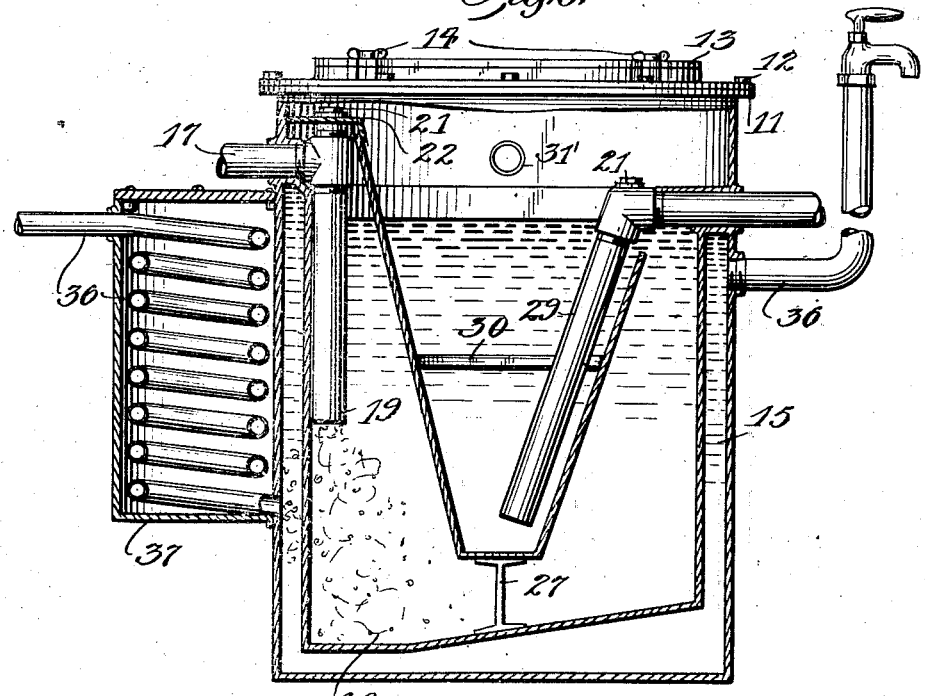
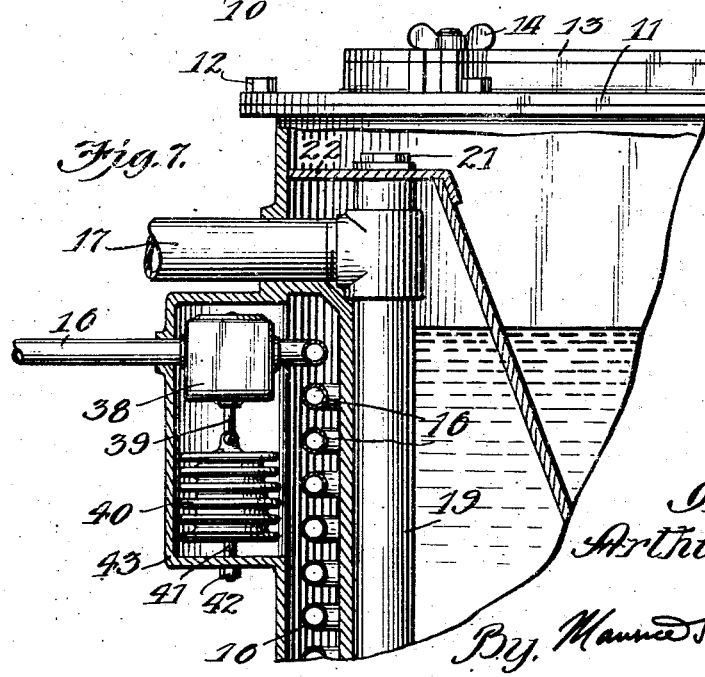

Patented Mar. 29, 1932

1,851,172

UNITED STATES PATENT OFFICE

ARTHUR GORDON, OF CHICAGO, ILLINOIS

GREASE TRAP

Application filed August 25, 1930. Serial No. 477,566.

This invention relates to a novel and improved apparatus for treating waste water from kitchens, slaughter houses, packing houses and the like, for the removal of fat or the like from those waters.

The main object of the invention is to provide a novel and improved apparatus of the character described, having associated therewith refrigerating means for cooling the entire body of said apparatus whereby the waste water entering said device will be kept constantly cold, congealing the grease as soon as it enters the same.

Another object of this invention is to provide, in an apparatus of the character described, a novel and improved means for constantly cooling the entire body of said apparatus whereby the grease or fat present in the waste water entering said apparatus will be immediately congealed and prevented from entering the outlet from said apparatus.

A further object of this invention is to provide, in an apparatus of the character described, a novel and improved separator whereby the waste water entering said apparatus will be caused to obliquely change its direction of flow, thus disturbing the equilibrium of the said waste water whereby separation of the various components of the mixture having different specific gravity is begun.

A still further object of this invention is to provide in an apparatus of the character described, a novel and improved separator which is adapted to cause a change in the direction of flow of the waste water entering said apparatus, said change in direction resulting in a separation of the various components of the waste water, and means associated with said apparatus adapted for chilling the entire body of said apparatus as well as the separator.

A still further object of the invention is to provide a grease trap of the character described, having means associated therewith for cooling the entire body of said trap, a novel and improved separator disposed within said trap and also having cooling means associated therewith whereby the waste water entering said trap will be immediately chilled, congealing the grease present therein, which will immediately flow to the top, a clean-out cover provided on said trap for removing said grease as frequently as is necessary, and an outlet for said trap for removing the waste water after it has discharged its grease.

A still further object of this invention is to provide a grease trap of the character described, having refrigerating means associated therewith whereby the entire body of said trap will be maintained at a constantly low temperature whereby the waste water entering said trap will be immediately chilled, causing the grease present therein to be congealed, whereupon it will rise to the top, an outlet for said waste water disposed adjacent the lower end of said trap, and a thermostatic control associated with said refrigerating means for maintaining a uniform temperature within said trap.

A still further object of this invention is to provide a grease trap of the character described, having a chilling chamber associated therewith and means for conducting a cold water supply through said chilling chamber.

A still further object of this invention is to provide a grease trap of the character described, a novel and improved separator disposed within said trap, said separator being adapted to cause a change in the direction of flow of the waste water entering said trap. Said separator is of substantially U-shaped cross-section, and is adapted to cause said waste water to flow downwardly to the lower portion of the trap, then upwardly along the side opposite to that of the inlet of the said trap, and then downwardly again to the center portion of said trap from which the waste water which has discharged its grease may escape through the outlet provided at the base on the inside of said substantially U-shaped separator.

A still further object of this invention is to provide in a grease trap of the character described, a novel and improved separator, said separator being of substantially U-shaped cross-section, and is adapted to extend across the full length of said trap whereby the waste water entering said trap will be forced to flow under the base portion of said separator, then upwardly and over one of the leg portions thereof, which change in direction of flow will cause a separation of the component parts of the waste water, the clear waste water flowing to the bottom of the separator from which it may be discharged through the outlet provided at that point.

A still further object of this invention is to provide an apparatus of the character described, which will be composed of few and simple parts constructed along lines convenient for low cost manufacture, which may be readily assembled and disassembled, and which will be highly efficient for carrying out the purposes for which it is designed.

With the foregoing and other objects in view, which will appear as the description proceeds, the invention consists in the arrangement and combination of parts hereinafter more fully described, illustrated in the accompanying drawings and particularly pointed out in the appended claims, it being understood that various changes in the form, proportion, size and minor details of the structure may be made without departing from the spirit or sacrificing any of the advantages of the invention.

For the purpose of facilitating an understanding of my invention I have illustrated in the accompanying drawings preferred embodiments thereof, from an inspection of which, when considered in connection with the following description, my invention, its mode of construction, and many of its advantages should be readily understood and appreciated.

Referring to the drawings, in which similar characters of reference are employed to indicate corresponding parts throughout the several figures of the drawings:

Figure 1 is a cross-sectional view taken through a grease trap embodying the principles of the invention;

Figure 2 is a view taken on line 2—2 of Figure 1 looking in the direction of the arrows;

Figure 3 is a cross-sectional view of the modified form showing the refrigerating means extending through the separator only;

Figure 4 is a top plan view of the trap;

Figure 5 is a sectional view of a further modification;

Figure 6 is a sectional view of a still further modified form; and

Figure 7 is an enlarged view of a thermostatic control means which may be associated with the form shown in Figures 1 and 3.

Stated generally, the invention comprises a grease trap having a cooling jacket provided therefor for chilling or maintaining the inner walls of said trap at a comparatively low temperature. This may be accomplished by the provision of refrigerating coils disposed within said cooling jacket, or by the passage of cold water through said cooling jacket. When the latter method is employed, a cold water supply is conducted through the chilling chamber so that whenever water is drawn at the kitchen sink, a fresh supply of cold water enters the jacket. This cold water may be precooled by the provision of a relatively long coil disposed within an ice cooled chamber, said chamber being provided on the grease trap adjacent the inlet of the cold water supply into the chilling chamber.

The interior of the trap is provided with my improved separator, which may be of substantially U-shaped cross-section, and is disposed centrally of the trap with the bottom thereof spaced from the bottom wall of the trap on which it may be supported in any suitable manner, and the top of said separator is removably secured in place adjacent the upper end of said trap whereby the same may be readily removed from the trap whenever it is found necessary to clean the sediment accumulated at the bottom of said trap.

Disposed within the separator adjacent the lowermost portion thereof, is the outlet leading from the trap. If desired, the said separator may be provided with a cooling jacket similar to that provided for the trap, said cooling jacket having suitable refrigerating coils extending therethrough for the purpose of chilling the same, or it may have a supply of cold water conducted therethrough in a manner similar to that employed in connection with the trap itself. A suitable screen may be disposed intermediate the top and bottom of said separator for the purpose of catching the lighter sediment, such as cotton waste, toothpicks and the like which may have risen to the top of the trap and which would otherwise enter the outlet from said trap. The suitable removable cover is provided for the top of said trap whereby the grease accumulating in said trap may be intermittently removed from the same as it slowly accumulates.

Referring to the drawings more specifically by characters of reference, the numeral 10 designates the basin proper, which is open at its upper end, which opening may be closed by the cover 11 held in place thereon by means of suitable fastening means 12, said cover 11 having a central opening provided therein, which opening is closed by a cover 13 held in place by means of wing nuts 14. The latter construction permits the quick and easy removal of the cover 13 to permit the removal of the grease accumulated at the upper portion of the basin.

Surrounding the major portion of the basin 10 is a jacket 15, which jacket is adapted to receive, in the embodiment illustrated in Figure 1, a suitable refrigerating coil 16, said coil extending through the jacket, and is adapted to maintain the said basin at a comparatively low temperature. The said coil 16 may be connected to any suitable refrigerating device (not shown), and, as the specific construction of refrigerating means forms no part of the present invention, it is not thought necessary to describe the same in more detail.

The numeral 17 designates the inlet of the basin, said inlet being connected to a T-joint 18 on the inside of the basin to one end of which is connected the pipe 19 which is placed against the inner wall of the basin and extends downwardly to a point intermediate the top and bottom of the basin, said pipe 19 being adapted for drawing downwardly the waste waters entering the inlet 17. The upper end of the joint 18 is provided with a plug 20, to which is detachably secured, by means of the nut 21 or in some other suitable manner, a plate 22 to which plate is rigidly secured my improved separator generally designated by the reference character 23.

As shown in Figures 1 and 2 of the drawings, the said separator 23 is of substantially U-shaped cross-section, and extends across the full length of said basin 10. The separator 23 comprises the inclined leg portions 24 and 25 and a substantially horizontally disposed base portion 26. In addition to the supporting plate 22, the separator 23 may also be supported at its lower end by means of the supports 27 provided on the bottom wall of the basin 10, there being one of such said supports adjacent each side of the basin. When in assembled position, as shown in Figure 1 of the drawings, the base portion 26 of the separator is spaced from the bottom wall of the basin to permit the passage of the waste water between the bottom wall and said separator.

In the embodiment illustrated in Figure 1, the separator 23 is also provided with a cooling jacket 28 in which is disposed a portion of the cooling coil 16 whereby the temperature of the walls of said separator may be maintained at a comparatively low degree. The said separator is so disposed within the basis 10 as to cause the waste water entering said basin to flow around the outside wall thereof and over the upper portion of the leg 25 and then downwardly into the space between the two leg portions of the separator. An outlet pipe 29 is provided for carrying away the waste water after the same has discharged its grease content, the lower portion of said outlet pipe 29 being disposed on the inside of the separator adjacent the lowermost portion thereof. Intermediate the top and bottom of said separator is provided a suitable screen 30, said screen being adapted to retain what sediment or solid impurities get into the downflow of the waste water as the same passes over the upper portion of the leg 25 of the separator. This sediment is generally the lighter element such as cotton waste, toothpicks and the like, which are generally present in the waste water issuing from dental laboratories and the like.

In operation of the embodiment illustrated in Figures 1 and 2 of the drawings, the waste water, as it comes from the kitchens, slaughter house, packing house, or any other such grease or fat producing place, flows through the inlet 17 under pressure or gravity into the trap, and out through the pipe 19, whereupon it flows downwardly and comes into contact with the leg portion 24 of the separator, which leg acts in the nature of a baffle plate or deflector. The waste water then changes its direction of flow and passes through the space between the bottom wall of the separator and the bottom wall of the basin, and then upwardly along the other side of said basin through the space between the side wall of the basin and the leg 25 of the separator, and then over the free upper end of the said leg 25, and down again into the space between the two leg portions of the separator. Because of the change of direction of flow of the waste water the equilibrium of the components of the mixture will be disturbed, whereupon the grease and fat particles will force their way upward and will accumulate at the upper level of the liquid in the basin, whereas the water which has discharged its grease and fat particles, as well as any lighter sediment present therein, will pass down the inclined leg 25 to the bottom of the separator, from whence it may be conducted away through the outlet 29. It will be readily apparent that, in the flow of the waste water around the outer wall of the separator, turbulence or eddies will be produced in the mixture resulting in a more ready separation of the grease or fat particles from the water.

All of the larger sediment or refuse passing into the basin will be cause and deposited at the bottom of the basin, a portion of the bottom wall of which may be disposed at an angle, as shown at 31, to facilitate in the easy removal of said sediment from the bottom of the basin. To remove this accumulation of sediment it is only necessary to remove the cover 11 and the separator 23, which is detachably secured in place by the fastening means 21, whereby easy access may be had to the bottom of the basin 10. A suitable air vent 31' may be provided adjacent the upper end of said basin 10 to permit the ready escape of any gases formed in the basin.

What fine sediment is not deposited at the bottom of the basin, and is floated upwardly to the top and into the space between the leg portions of the separator 23, will be retained and deposited on the screen 30 provided between said leg portions, from which it may be readily removed at intermittent periods through the opening closed by the cover 13.

By providing the refrigerating means through the chilling chambers 15 and 28 the waste water in the inner part of the trap will be kept constantly cold, causing the grease or fat particles present therein to congeal as soon as it enters the trap. This congealed grease will immediately float to the top, where it may be removed as frequently as necessary through the clean-out cover 13.

As shown in Figure 1 of the drawings, the upper free end of the leg portion 25 of the separator is disposed at a point below the level of the liquid, whereas the upper free end of the other leg of said separator is disposed at a point above said level. This construction is to permit the free flow of the waste water over the upper edge of the leg portion 25 even though there has been accumulated a considerable amount of grease at the level of the liquid in the basin.

In the modified form shown in Figure 3 of the drawings, the cooling jacket 15 for the basin 10 is eliminated, the congealing effect by cooling the waste water being accomplished by the cooling chamber 28 provided in the separator 23. The principle of operation and the results attained from the use of the modified form shown in Figure 3 are similar to that of the form shown in Figure 1, and for that reason it is not thought necessary to describe the same in more detail.

In a similar manner the cooling jacket may be eliminated from the separator provided on the basin 10. A modified form with that object in view is illustrated in Figure 5 of the drawings, in which form the walls of the separator are of a single thickness and have no means associated with them for chilling the same. In this form it will be noted that the chilling effect is produced by conducting a supply of cold water, which enters the chilling chamber 15 through the inlet pipe 35 and escapes through the outlet pipe 36. In every other respect the operation of this modified form will be the same as described in connection with the embodiment illustrated in Figure 1.

The modification shown in Figure 6 of the drawings is similar in construction to the modified form shown in Figure 5 with the exception that the cold water supply passing through the chilling chamber 15 is precooled by passing the same through an ice cooled chamber 37 in which chamber a portion of the cold water inlet pipe 35 is coiled and disposed so as to be cooled by the ice placed in the chamber 37 prior to the admission of the water into the chamber 15. The cold water outlet 36 may be connected to the faucet at the kitchen sink so that whenever water is drawn at the sink a fresh supply of cold water will enter the jacket.

In the modification shown in Figure 7 there is provided, in addition to the cooling coil 16 for maintaining the chilling chamber at a comparatively low temperature, a thermostatically controlled valve for maintaining said temperature at a predetermined constant degree. Obviously, any suitable form of thermostatic control may be employed, and in the embodiment illustrated, the same consists of a valve casing 38 through which the refrigerating coil 16 is adapted to pass, the valve disposed in said casing 38 having a stem 39 projecting therefrom, the end of which stem is connected to a bellows 40, the other end of which bellows may be adjustably secured by means of the stem 41 and nut 42 to a portion of the wall of the casing 43 in which the thermostatically controlled means is disposed. The bellows 40 may be filled with a suitable medium which will cause the said bellows to expand or contract, whereupon the stem 39 will be actuated to either open or close the valve in the valve casing 38, admitting a larger or smaller amount of refrigerating medium to the coil 16 disposed in the chilling chamber. By this means it will be noted that the temperature maintained within the chilling chamber will be uniform and of a predetermined degree.

As shown in Figures 3 and 5 of the drawings, the screen 30 may be eliminated, the same not being necessary whenever the waste waters do not have present therein any light sediment such for example as cotton waste, toothpicks and the like. This lighter sediment however, is generally present in the waste water issuing from dental offices and the like, and the screen should be provided in the installation of a trap of this character to be used in connection with the purifying of the waste water issuing from places where this nature of lighter sediment may be present.

As has been explained, the provision of the chilling chambers will cause a congealing of the grease or fat particles present in the waste water immediately upon the entrance of the same into the trap, said congealing causing a readier separation of said grease or fat particles from the water. Also, by providing my improved separator, the waste water, in flowing through the trap, is made turbulent so as to produce eddies therein, resulting in a breaking up of the various components of the mixture having different specific gravities, with the result that the grease or fat particles will rise to the top where they will accumulate and the water passing out of the outlet from the trap will be free of all grease or fat particles.

It is believed that my invention, its mode of construction, and many of its advantages should be readily understood from the foregoing, without further description, and should also be manifest that while preferred embodiments of the invention have been shown and described for illustrative purposes, the structural details are, nevertheless, capable of wide variation within the purview of my invention as defined in the appended claims.

What I claim and desire to secure by Letters Patent of the United States is:—

1. An apparatus of the character described, for separating grease from waste water, having a basin provided with an inlet and an outlet, a separator of substantially U-shaped cross-section disposed in said basin and spaced from the lower wall thereof, said separator extending across the full length of said basin, is adapted to cause the waste water to flow around the outer wall thereof before passing out of said outlet, the entrance end of said outlet being close to the inner wall of the base of said separator.

2. An apparatus of the character described, for separating grease from waste water having a basin provided with an inlet and outlet, a cooling jacket for said basin having a refrigerating coil disposed therein for maintaining said basin at a relatively low temperature, and a separator of substantially U-shaped cross-section disposed within said basin and between said inlet and outlet, and a cooling jacket associated with said separator having a refrigerating coil disposed therein for maintaining the said separator at a relatively low temperature.

3. An apparatus of the character described, for separating grease from waste water, having a basin provided with an inlet and outlet, and a hollow separator of substantially U shaped cross section disposed within said basin between said inlet and outlet, both said basin and separator having means associated therewith for maintaining the same at a relatively low temperature.

4. A device of the character described, adapted for separating grease from waste water, having a basin provided with an inlet and outlet, a removable separator disposed within said basin between said inlet and outlet, both said basin and separator being provided with chilling chambers for maintaining the same at a relatively low temperature, and refrigerating means disposed within said chilling chambers.

5. An apparatus of the character described, for separating grease from waste water, having a basin provided with an inlet and outlet, a separator of substantially U-shaped cross section removably held in said basin and spaced from the lower wall thereof, said separator extending across the full length of said basin and adapted to cause said waste water to flow around the outer wall thereof before passing out of said outlet, the entrance end of said outlet being close to the inner wall of the base of said separator, and refrigerating means associated with said basin and separator for maintaining the same at a relatively low temperature whereby the grease present in the waste water will be congealed immediately upon entering said basin.

6. An apparatus of the character described, for separating grease and sediment from waste water, having a basin provided with an inlet and outlet, a separator of substantially U-shaped cross-section disposed in said basin and spaced from the lower wall thereof, said separator being so disposed within said basin as to cause the waste water entering said basin to flow downwardly in a turbulent manner and then upwardly to a point adjacent the upper end of said basin and then downwardly again to the entrance of said outlet, said entrance being close to the inner wall of the base of said separator, and refrigerating means associated with both said basin and separator to cause the grease present in said waste water to congeal immediately upon entering said basin.

7. A device of the character described for separating grease and other sediment from waste water, comprising a basin provided with an inlet and outlet, a separator of substantially U-shaped cross-section disposed in said basin and adapted for causing a change in the direction of flow of the waste water after entering said basin, said separator extending across the full length of said basin and adapted to cause the said waste water to flow around the outer wall thereof and then down into the said separator before passing out of said outlet, the entrance end of said outlet being close to the inner wall of the base of said separator, and a screen disposed within said separator and intermediate the top and bottom thereof for catching any lighter sediment that they may have floated into said separator.

8. An apparatus of the character described, for separating grease and other sediment from other waste water, comprising a basin provided with an inlet and outlet, a separator of substantially U-shaped cross-section disposed within said basin between said inlet and outlet, the entrance end of said outlet being close to the inner wall of the base of said separator, and a screen disposed within said separator and extending across the full length thereof, said screen being held in place by the inner walls of said separator intermediate the top and bottom thereof.

9. An apparatus of the character described, adapted for separating grease and other sediment from waste water, comprising a basin provided with an inlet and outlet, a separator disposed in said basin between said inlet and outlet, a cooling jacket provided for said basin, a second cooling jacket provided for said separator, means for conducting a supply of cold water through both of said cooling jackets and means for precooling said cold water supply before entering said cooling jackets whereby a temperature low enough to congeal the grease present in said waste water will be maintained within said apparatus.

10. An apparatus of the character described, for separating grease from waste water, comprising a basin provided with an inlet and outlet, a hollow separator disposed within said basin between said inlet and outlet, both said basin and separator having means associated therewith for maintaining the same at a relatively low temperature, and a thermostatic control means associated with said last mentioned means for automatically regulating the temperature thereof.

In testimony whereof I affix my signature.

ARTHUR GORDON.